Oct. 24, 1961  J. T. ROBERTS ET AL  3,005,553
MATERIAL EXTRACTING DEVICE
Filed July 5, 1957  2 Sheets-Sheet 1
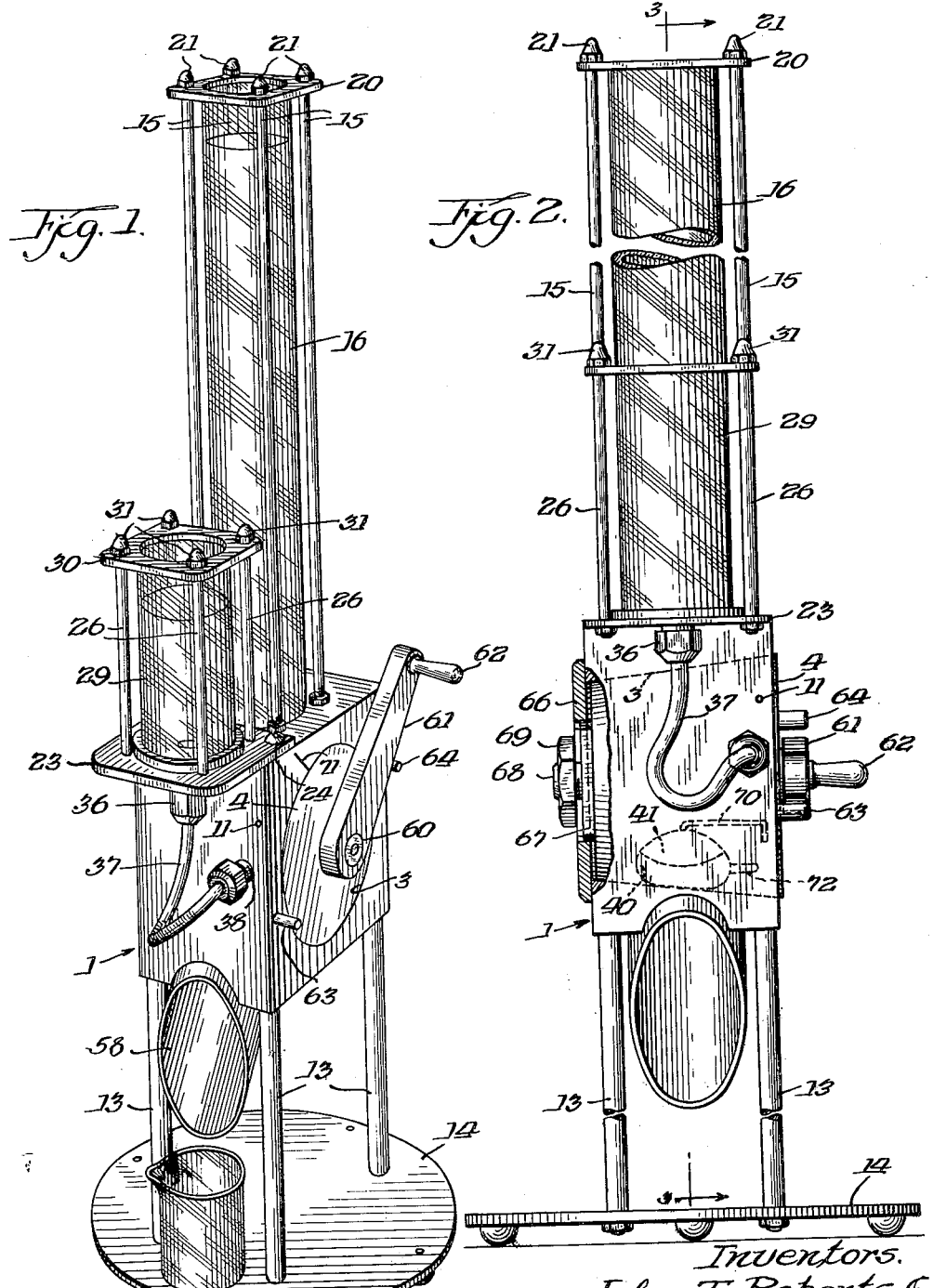
Inventors.
John T. Roberts, &
Julius A. Hjulian.
By Joseph O. Lange
Atty.

Oct. 24, 1961   J. T. ROBERTS ET AL   3,005,553
MATERIAL EXTRACTING DEVICE
Filed July 5, 1957   2 Sheets-Sheet 2
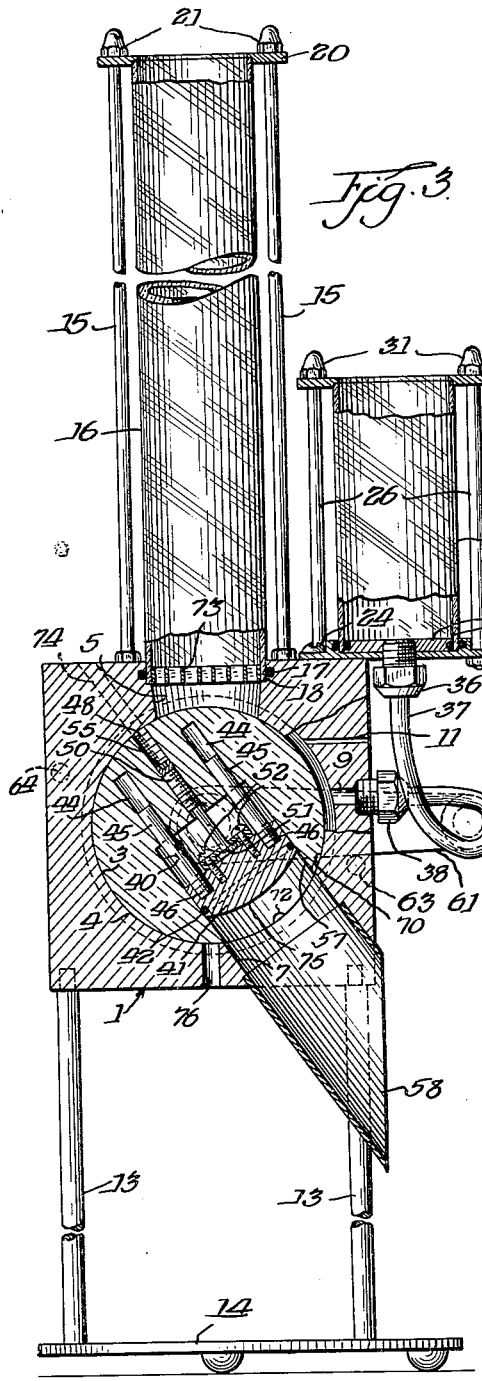
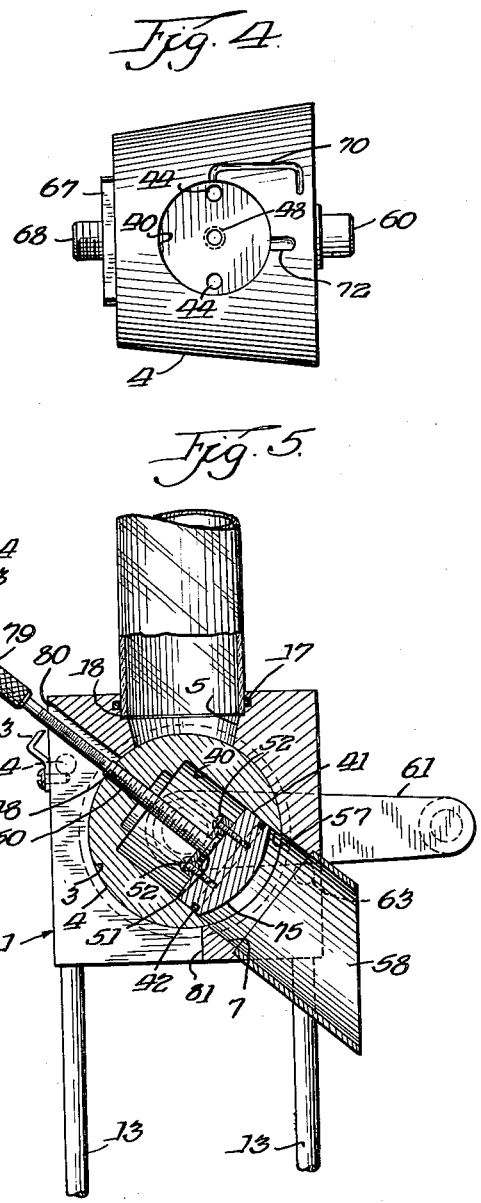
Inventors.
John T. Roberts, &
Julius A. Hjulian.
By Joseph O. Lange : 3,005,553
Patented Oct. 24, 1961

3,005,553
MATERIAL EXTRACTING DEVICE
John T. Roberts, Glen Ellyn, and Julius A. Hjulian, Palos Heights, Ill., assignors to Crane Co., Chicago, Ill., a corporation of Illinois
Filed July 5, 1957, Ser. No. 670,329
2 Claims. (Cl. 210—83)

This invention pertains generally to a material or substance handling device, and more especially it is directed to a device for extracting fluid or solid from a container.

It is often desirable to determine the settling rates of solids from liquids as for instance of clays used in the ceramic industry. This is for the purpose of study and of control of shipment or batches in industrial use.

Up until now there has not been any satisfactory method of determining settling rates. The first of two known methods has been to employ a series of six glass cylinders (where a seven point curve is desired) preferably of the large 500 cc. size into each of which equal volumes of liquid and also equal weights of solids are placed and mixed, the times when mixing is completed and settling allowed to commence recorded for each cylinder, and the solids allowed to settle to the bottoms of the cylinders for varying periods, such as 5 minutes for the first cylinder, 15 minutes for the second, and so on to 24 hours for the last one. After each of the settling periods the liquid and unsettled solid is decanted from the respective cylinders and the cylinders and the settled solid dried and the latter scraped out of the cylinders and weighed. The ratio of the weighed amount to the amount originally placed in the cylinder gives a percentage of weight which is plotted against the time, as the 5 minutes and so on. This method is objectionable for the following reasons:

First, the method is inefficient from the standpoint of apparatus and material requirements (solids to be tested and electrolyte such as a mixture of sodium silicate and sodium carbonate)—one sample and one cylinder being needed for each determination—six cylinders and six samples for a 7 point graph. A large oven is needed for drying the cylinders and material prior to weighing. Also there is considerable breakage of cylinders, requiring frequent replacement.

In the second place the method is time consuming in the matter of preparing the six samples requiring the placing of equal quantities of liquid in each of the cylinders and the weighing out and placing therein of equal amounts of solids, mixing the solids in the liquid, recording the times when the solids are completely mixed and in uniform suspension throughout the liquid and the mixing stopped to start the tests, noting expiration of each of the time periods marking the end of each test, carefully tilting each of the six cylinders and pouring off the liquid and unsettled solid therefrom without allowing any of the sedimented solid to escape therewith which would introduce error in the calculations, placing each of the six cylinders and remaining contents successively within the oven and waiting for drying to be effected, scraping out the dried solid from the bottom and along the length of each of the six cylinders in turn by means of a spatula or the like, weighing of the residue so extracted, and cleaning and drying of the six cylinders for the next test, all with a minimum of breakage.

Third, the method is not very accurate because it is impossible to decant or siphon the unsedimented portion from the sedimented portion without causing disturbance or intermixing and consequent loss of some of the sediment with the unsedimented portion. Also, considerable of the sediment adheres to the inside surfaces and corners of the cylinders and is impossible to entirely remove without scrubbing with abrasive which is done in the cleaning process.

The other known method of determining settling rates has been to hang a balance pan in the suspension upon which the solid can settle, thus giving cumulative weights for progressive settling times from which a curve can be plotted. Elaborate equipment has been developed for this method. This method, however, is subject to serious inaccuracies by the way of convection currents and settling of the solid beneath and around the pan with resultant effect on the weight of the pan. Such inaccuracies have been shown by various persons and recognized as being appreciable. It is also contended that electrical influence cause particle migration to the walls and by the pan. The difference in density because of the difference of concentration of particles in suspension above and below the pan, also is a source of error in the weight determinations.

Besides determination of sedimentation rates, it is also most desirable to be able to separate out or extract the solid that has settled from the beginning to the end of the first test period and from the end of such test period to the end of the next successive one, and so on. This separation into fractions or fractionation is essential for the purpose of study and determination of what it is that settles out, as well as how much, during different stages of the total settling process. It will be recognized in this connection that soils and clays are composed of many minerals. Such determination is important for various purposes including analysis of the clays and setting up controls and specifications for shipment and batch preparation for industrial use. There is no prior art device or method known that will produce such desired fractions.

It is accordingly an important object of the present invention to provide satisfactory and accurate means of determining settling rates of solids from liquids, which avoids the difficulties of the prior methods.

Another important object is to provide means for determining settling rates of solids from liquids which avoids the prior art difficulties and in addition provides for the extraction of fractions of settled solid at various stages of the settling process for separate study and analysis of composition or mineral content.

Other objects and advantages will become more readily apparent upon proceeding with the description read with the accompanying drawing, in which:

FIG. 1 is a perspective view of a device illustrating one form of the present invention,
FIG. 2 is a side elevation of the same,
FIG. 3 is a sectional view thereof taken along the lines 3—3 of FIG. 2,
FIG. 4 is a plan view of the tapered plug showing the recess therein and with the piston removed, and
FIG. 5 is a view similar to FIG. 3 showing a modified form. Similar reference numerals refer to similar parts throughout the several views.

Referring now in detail to the drawing figures and more particularly to FIGS. 1 through 4, the numeral 1 designates the body portion of the extracting or dispensing device which body consists essentially of a rectangular solid of metal such as brass containing various apertures and reliefs which will now be described. Extending horizontally through the body portion from the front to the rear is a conically shaped bore or aperture 3 within which is received a similarly shaped conical plug member 4 adapted to be rotatable therewithin. The conical bore and plug member are so disposed and arranged as to be of maximum diameter at the front to permit introduction of the plug member from the front for assembly purposes.

The body member is also provided with a vertical opening 5 extending from the upper surface thereof to the inner conical surface 3 so as to form an entrance from above the body to within the latter. The body is further provided with an additional opening 7 at the bottom part thereof, which communicates from the inner conical surface 3 to the exterior of the body for discharge purposes as will appear later. The body is further provided with a side port 9 and a vent 11, the purposes of which will later be made clear. Rod-like legs 13 are secured to the bottom of the body portion as by means of threading to serve as supporting legs for the device, such legs further being received in the base member 14 in suitable fashion.

Extending above the body and similarly threaded therewithin are a plurality of stanchions or supporting members 15 within which is received a glass tube-like container 16 fluid sealedly received within the opening 5 by means of a gasket or O-ring 17 and resting on an annular shoulder 18. This container supports an upper flat piece 20 at the top through which the stanchions 15 extend for the purpose of retaining the container 16 in mounted relation on the body portion. Such retention is had by virtue of cap nuts 21 which are threaded onto the tops of the stanchions and bear against the flat piece 20. The latter flat piece is also apertured therethrough in registry with the inner bore of the container 16 for the admission of the samples or components to be tested. Means for covering the opening in the flat piece may be provided in order to keep out room dust or the like and prevent contact with air currents during progress of the tests, but applicants have employed a cylindrical plastic member of bell jar like construction (not shown) for so preventing dust from entering the device either before or during the progress of the test.

Another flat piece 23 is secured to the top of the body 1 by means of a pair of screws 24 (only one being visible in the drawing). Four additional posts or stanchions 26 are supplied which are threadedly received within the flat piece 23 at the bottom. Within the stanchions 26 is another tube-like container 29 of much less height than the container 16, being retained on the flat piece 23 by means of an upper flat piece 30 similar to the member 20 at the top of the other reservoir. The posts 24 and 26 extend through the top piece which is secured on the top of the reservoir by means of cap nuts 31 similar to cap nuts 21. The flat piece 30 also is apertured in registry with the inside diameter of the reservoir 29 similar to that of the top 20 and for the same purpose, that is, for the introduction of liquid within the container 29. The previously mentioned plastic cover (not shown) will, of course, extend over both of the containers 16 and 29 as well as the rest of the device for prevention of dust introduction in either of the containers.

For the purpose of sealing the bottom of the container 29 against fluid leakage, a circular disc 33 is provided within the bottom-most portion of the container 29 and resting on the top of the bottom piece 23, which disc member is annularly recessed for reception of a sealing O-ring 34 which engages the inner surface of the container 29 in sealing relation. The disc member threadedly receives a fitting 36 which extends through the bottom piece 23, which fitting has attached thereto a tube 37 on the end of which is another fitting threadedly received within the body portion at 38. It is obvious that the latter pipe section and elbow provides communication between the inside of the reservoir 29 and the hollow interior of the body 1.

Returning to the description of the tapered plug member 4, the same contains a cylindrical relief or the cavity 40 within which is received a reciprocally movable piston 41. The piston is annularly recessed or grooved near the front end thereof for reception of an O-ring 42 for fluid sealing engagement around the inside of the cavity 40. The plug member 4 is further relieved at 44 at each side for reception of round guide pins 45 received within the piston at 46 for guidance of the latter in its reciprocal movement. The plug member is additionally relieved through the center at 48, said relief communicating from the cavity 40 to the outer surface of the plug member. Within the latter relief 48 is threadedly received at 49 a screw element 50 which terminates in a flattened portion 51, which latter screw member is secured to the piston by means of a pair of screws 52 threadedly received within the piston and extending through a washer 53 engaging the bottom of the flattened end 51 of the screw member 50. The rear end of the screw 50 is provided with a socket 55 for insertion of an Allen head wrench and to effect axial movement of the piston for a purpose to appear later.

It will be noted that as the piston is presently adjusted in the drawing illustration a certain unoccupied portion of the cavity 40 is provided which is denominated by the numeral 57. This unfilled portion provides a receiving chamber for a purpose that will now appear. It should also be noted that a discharge spout 58 is provided at the lower end of the discharge opening 7 for the flow of liquid and settled solid from the body into a beaker or the like. The plug member 4 is provided with a forward extension 60 upon which is fixed a lever arm 61 and handle 62 by means of which the plug member is rotatably movable between the limits fixed by pins 63 and 64 also mounted in the front of the body. The plug member is retained within the body by means of a flat disc-like member 66 which extends across the rear of the body cavity and through which an elongated boss 67 of the plug member and the threaded hub 68 thereof extend and to which latter hub a retaining nut 69 is attached.

In one method of operation the lever 61 is first turned into contact with the post 64 so as to place the chamber 57 in registry with the relief 5 of the body. The plastic cover (not shown) has already been removed for the manipulation of the handle and the predetermined quantity of liquid or electrolyte such as an aqueous solution of sodium silicate and sodium carbonate and solids such as clay, suitably mixed so as to be in suspension therein, is poured into the container 16. When the mixture of liquid and solid reaches a predetermined height and the pouring completed, the test begins and the time thereof recorded. Subsequent to the pouring into container 16 or prior thereto a sufficient quantity of clear liquid or electrolyte of identical kind to that contained in the reservoir 16 is poured into the smaller reservoir 29, the only difference between the two liquids being that there is no solid material in suspension within the latter liquid. After a predetermined time interval such as five minutes for the first test period, the arm 61 is rotated into contact with pin 63 by means of the handle 62. This movement rotates the plug member 4 clockwise as seen in FIG. 3 and removes the chamber 57 from the position of registry with the relief 5 into registry with the discharge opening 7. It is obvious that the fluid within the chamber 57 together with the larger part of the contained sediment which has settled out from the liquid of container 16 during the first test period will discharge or run off through the spout 58 into a beaker or the like placed thereunder. To obtain complete evacuation of the sediment received within the chamber 57, a stream of distilled water is played therewithin in order to dislodge and flush out all particles of sedimentation. The ordinary wash bottle or chemical squeeze bottle may be employed for this purpose. The beaker containing the solid material plus the liquid, is then heated so as to vaporize the liquid and leave the solid which can be removed and weighed according to the usual laboratory process.

After evacuation of the sediment resulting from the first test, the handle is then rotated in the reverse direction up to mark 71 on the front of the body 1 which places an extension 72 of the chamber 57 opposite and in communication with the opening 9 for the purpose of introducing clear liquid from the reservoir 29 so as to completely fill the chamber 57 therewith preparatory to moving the plug member back to the initial position in registry with the opening 5. It should be noted that during the intermediate or port 9 communicating position the passage or vent 11 also communicates between the chamber 57 and the atmosphere by means of the intermediary relief 70 in the plug member (see FIG. 4). This is for the purpose of allowing the escape of entrapped air as the liquid of the reservoir 29 flows within the chamber 57 through the opening 9 and relief 72.

After complete filling, the handle 62 is further turned back to the starting point which once more places the chamber 57 into registry with the inlet opening 5. It should be noted that inasmuch as the chamber 57 has been filled with clear liquid through the port 9 prior to movement thereof into registry with the opening 5 there cannot be any discharge of the liquid within the reservoir 16 into the chamber 57 upon the movement of the plug member into the starting position so as to cause turbulence of the liquid within the chamber 16 and disruption of the normal settling rate of the solid therein. It should also be noted that any solid that has settled out during the time the plug member has been rotated from the initial position will have settled onto the conical surface of the plug member. Inasmuch as the conical plug member is extremely close fitting within the conical opening 3 of the body such matter so sedimented will not be carried with the plug member as the same rotates back into its normal position but rather will be scraped or pushed into the chamber 57 as the same passed into registry with the opening 5. Due to the close fitting relation of the tapered plug and the tapered opening receiving the same there will be no loss of such sedimented material during the relatively short time that the plug member has been rotated out of its starting position. If desired, however, further means may be provided such as an annular wiping ring (not shown) located around the opening 5 at the juncture thereof with the surface of the plug member.

After the termination of the second settling period of the test, as for instance 15 minutes, the handle is again turned so as to rotate the chamber 57 into registry with the opening 7 for discharge of the sediment in the like fashion to that previously described. It is clear that the solid material gotten from the second part of the test will represent only that settling out from the end of the first test period to the end of the second, so that the same can be analyzed apart from the material previously obtained. This is of importance, as indicated in the preamble to the specification, as not only providing weight data for the plotting of the sedimentation curve, but also to provide separation of the solid matter sedimented into separate fractions for individual study and analysis purpose. The process of rotating the plug member counter-clockwise, as seen in FIG. 3, for filling through the opening 9 and thence into registry with the opening 5 is repeated for each part of test, which preferably consists of six parts for a proper sedimentation curve and material analysis.

It will thus be seen that besides the benefit of obtaining fractions of the solid matter representing the additional settling times over that or those of the previous test period or periods but a single sample of liquid and solid is used and contained in but a single cylinder or tube 16 for all these tests. This is in contrast with the six samples of liquid and solid and the six cylinders of the first method mentioned in the preamble to the specification. Also, and it is impossible to overly stress this, removal of the sedimented particles in the present method is extremely simple, quick, and infinitely more accurate as compared to the previous method noted. Also, and in contrast with the balance pan method mentioned in the preamble of the specification, the entire amount of the settled solid is received within the chamber 57, none being lost, in contrast with the substantial loss occurring around the pan due to the space itself, the action of the currents and further, the electrostatic attraction of the particles towards the side walls, as is the case with the method noted.

It should also be noted that no fractions of the material settling can be gotten from this method, but that all of it, supposedly, settles on the pan in the course of the test. Separate fractions are also not obtainable from the first method noted. In fact, there is no known method of so obtaining such fractions except that of the present applicants.

It should further be noted that the second cylinder 29 of applicants' device is much shorter than the cylinder 16. This is for the reason that only enough liquid need be contained within the former to fill the chamber 57 with clear liquid or electrolyte six times or whatever is the number of test periods employed. This reservoir 29 therefore does not need to be very large.

Also, if desired, the reservoir 29 and associated parts and connection may be eliminated and in such case a slightly different procedure will be employed. According to the latter method, an opening 74 is provided in the body 1 through which an Allen head wrench may be inserted into the socket 55 at the end of each test period and after rotation of the plug member and receptacle of chamber 57 thereof into the lower discharge position and evacuation of the contents for movement of the reciprocal piston downwardly so as to place the conical surface 75 in flush relation with the exterior surface of the plug member. After removal of the wrench, the handle 62 is rotated back into contact with the pin 64, thus moving the plug into the starting position. However, this time there will be no cavity 57 for the liquid in the reservoir 16 to rush into and thus cause turbulence. An additional opening 76 is provided in the bottom of the body for insertion of the Allen head wrench into the socket 55 for rotation of the screw 49 and withdrawal of the piston 41 into a predetermined position as indicated for instance by the appearance of a mark on the wrench and alignment thereof with the outside of the body 1 or by lowering of the liquid level in the container 16 by a predetermined amount as indicated by graduations thereon. This predetermined position or extent of the chamber 57 is of course equal to that previously had when starting the test. By the slow withdrawal of the piston 41 rapid flow of the suspension of container 16 into the chamber 57 is prevented, thus also preventing the creation of any turbulence which would stir up the sediment and disturb the liquid and through error in the tests. It should also be pointed out that the opening 76 is present even though the reservoir 29 is employed so as to provide for adjustment of the piston 41 and consequently the size of the chamber 57. Also, where the reservoir 29 is eliminated and the additional opening 74 used, the downward movement of the piston after rotation of the plug member into the discharge position may be employed to remove the sediment adhering to the side wall, by a wiping action of the resilient O-ring against the side wall, any washing being required only of the conical surfaces 74 and periphery around the O-ring.

FIG. 5 shows a more convenient arrangement of the above idea wherein the reservoir 29 is eliminated, in which the screw 49 is extended downwardly of the body portion and is surmounted by a knob 79. The body has an open slot from 80 to 81 so as to permit rotation of the plug member with it from the opening 5 to the opening 7 registry positions. It is obvious that by means of the handle 79, the screw 49 may be turned for movement of the piston alternately into the retracted chamber forming position and extended flush position. Suitable marks should be placed on the smooth shank of the screw and readily observable from the outside and preferably indicated by a pointer 83 to indicate both the flush or surface forming relation of the piston and also the predetermined chamber forming position. Also, if desired, graduated indications may be placed along the stem of the screw 49, also observable from the outside and for placement opposite pointer 83, which would automatically procure a certain capacity of the chamber 57, as for instance 5, 10, 15, 20 cc.

Although the basic idea of the invention has been applied to a material or substance extracting device and method, a device of the general type of FIGS. 1 through 4 may be employed for mixing different fluids under pressure or of bringing solids into contact with a fluid under pressure for chemical or physical action therewith. In the case of mixing under pressure, at least, the container 16 would have to be a pressure vessel.

It is not desired to limit the invention to the forms and ideas disclosed but rather to the terms of the appended claims, liberally construed.

We claim:

1. A method of successively extracting solid particles settling out from liquid over a period of time without causing substantial turbulence of the liquid and solid particles still unsettled therefrom comprising the steps of placing receptacle means in substantial fluid sealed relation with open bottomed means so as to form the lower part and bottom thereof, introducing liquid containing solid particles into said open bottomed means and receptacle means forming the lower part and bottom thereof, allowing passage of time within which settling of part of the solid particles to the bottom can occur, removing the receptacle means from under said open bottomed means and simultaneously closing the bottom of the open bottomed means to prevent substantial loss of liquid and solid particles, emptying the contents of the receptacle means including the solid particles settled out during the passage of time, filling the receptacle means with nonsolid containing liquid, opening the bottom of the open bottomed means and simultaneously moving the receptacle means into the fluid sealed relation with the open bottomed means so as to form the lower part and bottom thereof, allowing further time to elapse for permitting additional solid particles to settle out into said receptacle means, removing the receptacle means from under the open bottomed means, and emptying the contents thereof.

2. A method of successively extracting solid particles settling out from liquid over a period of time without causing substantial turbulence of the liquid and solid particles still unsettled therefrom comprising the steps of removing means closing the bottom of open bottomed means within which the liquid and solid particles are contained and simultaneously placing receptacle means substantially filled with nonsolid-containing liquid under said open bottomed means in substantially fluid sealed relation therewith so as to form at least the bottom of the open bottomed means, subsequently removing the receptacle means from under said open bottomed means and simultaneously closing the bottom of the open bottomed means to prevent substantial loss of liquid and solid particles, emptying the contents of the receptacle means including the solid particles settled out from the liquid, refilling the receptacle means with nonsolid-containing liquid, and repeating the cycle as desired.

References Cited in the file of this patent

UNITED STATES PATENTS

| | | |
|---|---|---|
| 272,072 | Michaelis | Feb. 13, 1883 |
| 686,515 | Geddes | Nov. 12, 1901 |
| 712,164 | Whitlock | Oct. 28, 1902 |
| 874,757 | Fox | Dec. 24, 1907 |
| 1,597,358 | Hansen | Aug. 24, 1926 |
| 1,698,183 | Bartlett | Jan. 8, 1929 |
| 2,097,887 | Lacey | Nov. 2, 1937 |
| 2,692,068 | Worswick | Oct. 19, 1954 |